United States Patent [19]
Helmers

[11] 3,737,018
[45] June 5, 1973

[54] ONE WAY CLUTCH AND BRAKE DEVICE

[75] Inventor: Helmut Helmers, Wilhelmshaven 294, Germany

[73] Assignee: Olympia Werke A.G., Wilhelmshaven, Germany

[22] Filed: Feb. 4, 1971

[21] Appl. No.: 121,018

[30] Foreign Application Priority Data
Mar. 28, 1970 Germany..................P 20 14 996.6

[52] U.S. Cl..................................197/64, 188/184
[51] Int. Cl..................................B41j 19/02
[58] Field of Search.............188/180, 184, 185; 197/64

[56] References Cited

UNITED STATES PATENTS

| 1,003,414 | 9/1911 | Barrett | 197/64 UX |
| 3,288,260 | 11/1966 | Sargent | 197/64 |
| 3,595,360 | 7/1971 | Mueller | 197/64 |

*Primary Examiner*—Duane A. Reger
*Attorney*—Michael S. Striker

[57] ABSTRACT

A brake is operated by a typewriter carriage moving in a tabulating direction due to the operation of a one way clutch having cylindrical input and output portions connectable by a coiled clutch spring, and being spaced by an axial gap. A manually turnable shaft has a flange abutting the output part and is threaded into a housing wall for effecting realtive axial displacement of the cylindrical input and output portions, and thereby an adjustment of the width of the gap.

10 Claims, 3 Drawing Figures

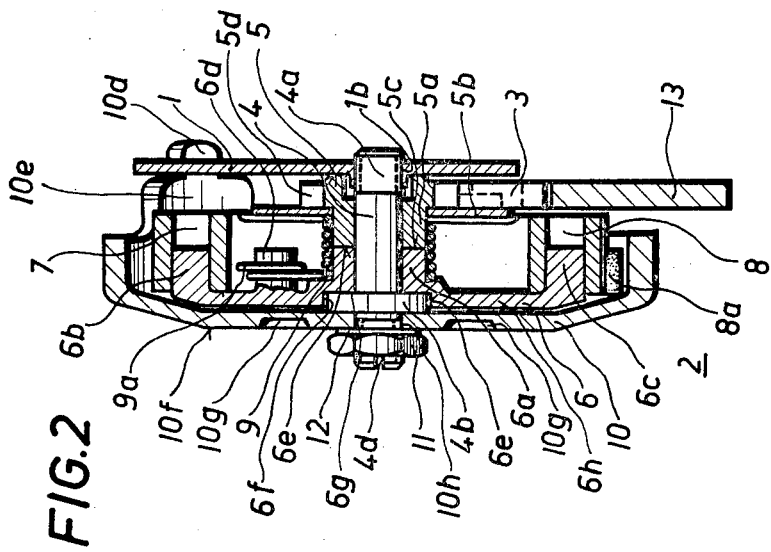
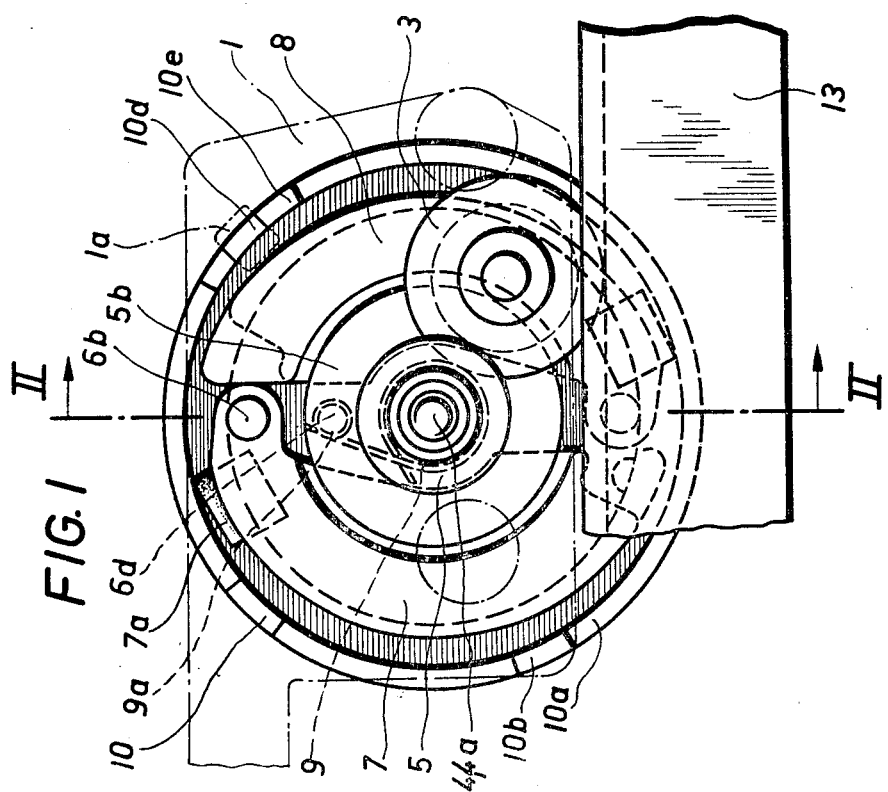

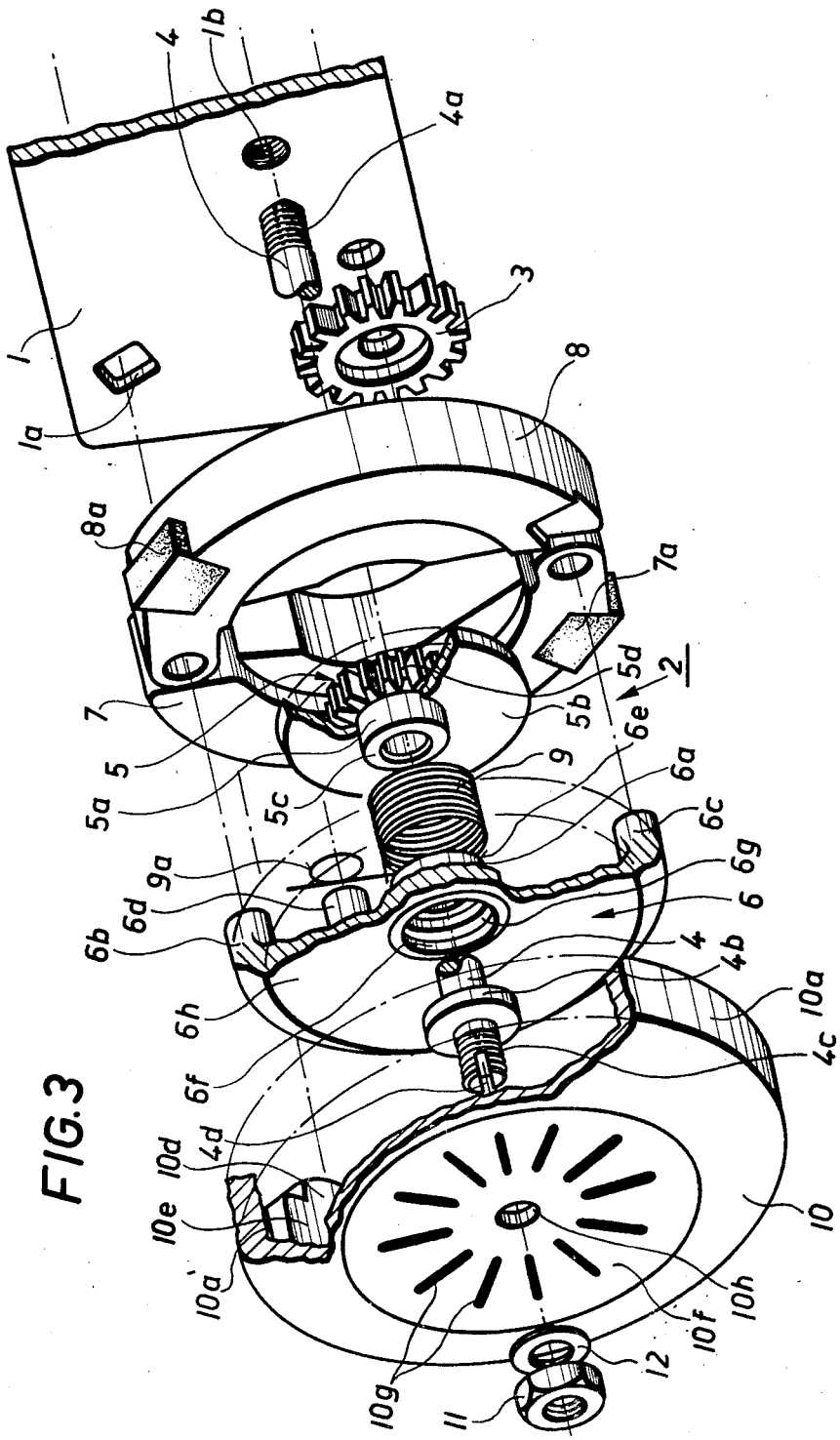

ONE WAY CLUTCH AND BRAKE DEVICE

BACKGROUND OF THE INVENTION

Centrifugal tabulator brakes for typewriter carriages and the like, are known which employ a one way clutch controlled by a coil spring which is contracted or spread depending on the direction of rotation.

One way brake and clutch devices of this type serve the purpose of regulating the speed of a typewriter carriage, particularly during tabulating operations, by centrifugal brake weights, while during the return movement of the carriage, the brake means are not rotated and consequently inoperative so that the carriage can be returned without any braking action.

A one way clutch with cylindrical input and output portions and a spring coiled about the same, requires a very fine adjustment in order to obtain the necessary play between the input and output parts. Such fine adjustment requires very high precision during manufacture, which increases the cost of the device.

Another disadvantage is that once the play between the input and output parts is predetermined and set, a later correction of the axial play between the input and output parts is not possible. This requires a very precise machining of the end faces of the cylindrical input and output portions of the clutch, which further increases the cost. Particularly, if one way clutches of this type are used in connection with tabulator brakes, it has been found that the end faces of the input and output portions are worn whereby the previously adjusted gap becomes wider, so that turns of the coil spring enter the gap between the end faces, and jam the input and output parts, which causes damage.

SUMMARY OF THE INVENTION

It is one object of the invention to provide a centrifugal one way clutch and brake device, particularly for braking a tabulated typewriter carriage, which is free of the disadvantages of prior art construction, has a simple and reliable structure, and can be inexpensively manufactured.

Another object of the invention is to provide a one way clutch and brake device which can be adjusted from the outside so that the gap between the input and output parts of the clutch has a desired axial width, preventing the entering of the wire of which the coil spring is formed into the axial gap.

Another object of the invention is to render the brake means completely inoperative during the return movement of the typewriter carriage, whose tabulating movement is braked by the device.

In accordance with the preferred embodiment of the invention, one end of an adjusting shaft, which can be manually operated, is threaded into a fixed plate, and projects with the other end out of an end member for manual adjustment. The shaft supports input and output means of a one way clutch, which are spaced by a narrow gap, whose axial width can be adjusted by turning the shaft. A flange on the shaft cooperates with the input part of the clutch to move the same under manual control toward and away from the output part so that the width of the gap can be adjusted. Since the end of the shaft projects out of the housing for manual adjustment, any required adjustment can be carried out at any time. Due to the fact that the gap between the end faces of the input and output parts of the clutch is variable, inaccuracies due to faulty manufacture or assembly, or due to wear after prolonged use, can be eliminated.

It is advantageous to provide on the brake housing, means for indicating the angular position of the projecting manually adjustable portion of the shaft.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a rear view of one embodiment of the invention shown to cooperate with a rack bar forming part of a typewriter carriage;

FIG. 2 is an axial sectional view along line II—II in FIG. 1; and

FIG. 3 is a perspective exploded view illustrating the embodiment of FIGS. 1 and 2, and having parts broken off for the sake of clarity.

DESCRIPTION OF THE PREFERRED EMBODIMENTS

Referring now to the drawings, a tabulator brake 2 has a brake housing including a first end member in the form of a fixed plate 1 secured to the frame of the typewriter, and a second dished end member 10. A rack 13, which is part of the paper carriage of a typewriter, is located in the proximity of the fixed plate 1, and meshes with a pinion 3 which is mounted on the fixed plate 1 for rotation. During movement of the carriage and rack 13 in tabulating and return directions, respectively, pinion 3 rotates in opposite directions. A shaft 4 has a threaded end portion 4a threaded into a corresponding threaded bore 1b of the fixed plate 1. The other end portion 4c of shaft 4 is also threaded, and projects through a central bore 10h in end member 10 out of the housing for manual turning adjustment by means of a screw driver inserted into a slot 4d in the end face of end portion 4c. A nut 11 and a washer 12 are mounted on the threaded end portion 4c.

Shaft 4 has a flange 4b forming an abutment, and by tightening of nut 11, end member 10 can be pressed against flange 4b, while turning adjustment of shaft 4 can be carried out upon loosening of nut 11.

Shaft 4 rotatably supports an input means 5 which includes a cylindrical input portion 5a integral with a gear 5d, and a disc 5b secured to the same. Gear 5d meshes with pinion 3 in the assembled condition of the device so that input means 5 is rotated in one direction when the rack 13 moves with the paper carriage of the typewriter in the tabulating direction, and in the opposite direction when the carriage is returned to its initial position.

An output means 6 includes a cylindrical output portion 6a, a disc 6h on which pivots 6b and 6c are provided, a central opening 6f, and an annular end face or shoulder 6g against which flange 4b abuts in the assembled condition shown in FIG. 2. Centrifugal brake means 7 and 8 are mounted on pivots 6b and 6c for angular movement between a retracted inner position, and an outer braking position in which brake linings 7a and 8b engage the inner cylindrical brake surface 10a' in flange 10a of end member 10. Brake means 7 and 8 are moved by the centrifugal force to the outer braking position when output means 6, on which they are mounted, rotates at a sufficiently high speed.

A coiled clutch spring 9 is mounted on the cylindrical input portion 5a and cylindrical output portion 6a. One end of coil spring 9 is secured to the input means 5, and the other end is wound about a stud 6d on disc 6h of output means 6, as best seen in FIG. 3. It will be seen that relative angular movement between input means 5 and output means 6 will cause contraction of spring 9 or expansion and spreading of spring 9, depending on the direction of rotation of input means 5 according to the direction of movement of the rack 13.

The annular end faces 5c of input portion 5a and 6e of output portion 6a, preferably form a narrow gap whose axial width is less than the thickness of the wire of spring 9, so that the same cannot enter into the gap. On the other hand, the gap prevents high friction and wear of the input and output portions 5a and 6a.

The dished end member 10, has angularly spaced axially projecting abutments 10b, 10c, 10e, which abut the fixed plate 1 in the assembled condition of the device. The abutment 10e has a projection 10d which projects into a cutout 1a of the fixed plate 1 in the assembled condition of the device, so that the end member 10 cannot be turned relative to the fixed plate 1 on shaft 4 when the device is assembled.

OPERATION

First, the threaded end portion 4a of shaft 4 is threaded into the threaded bore 1b of the fixed plate 1, with the input means 5 and output means 6 already assembled on shaft 4. Shaft 4 is manually turned by a screw driver inserted into a slot 4d, and is moved by thread 4a in axial direction so that flange 4b first engages the end face 6g and then moves output means 6 to a position in which the end faces 6e of the cylindrical output portion 6a abuts the end face 5c of the cylindrical input portion 5a without any play or gap.

The end member 10 is now mounted on end portion 4c of shaft 4, which passes through the central bore 10h. End member 10 is lightly attached by screwing nut 11 onto the threaded end portion 4c. In the correct angular position of end member 10, the projection 10d enters the rectangular cutout 1a of the fixed plate 1, so that end member 10 is fixed against angular movement.

The gear 5d meshes with pinion 3 when the end faces 5c and 6e abut each other.

The desired axial gap between end faces 5c and 6e can now be obtained by turning the manually operable end portion 4c, which projects out of end member 10 through bore 10h. Nut 11 is turned to loosen end member 10, so that the same does not press against flange 4b.

The desired gap between end faces 5c and 6a can now be adjusted by turning shaft 4 so that threaded portion 4a moves out of threaded bore 1b of the fixed plate 1.

The slot 4d, into which a screw driver may be inserted for the adjustment operation, assumes different angular positions which can be identified by the indicating means 10g which are radial equally spaced indicia on the wall 10f of end member 10.

In the illustrated embodiment, 12 indicia lines 10g are provided so that 12 angular positions of the adjustment shaft 4 can be identified which correspond to variations of the axial width of the gap between the end faces 5c and 6e. A variation of the gap depends on the pitch of the thread of the threaded end portion 4a, and when the slot 4d is turned from one radial indicia line 10g to the next, the axial width of the gap is increased one twelfth of the pitch of the thread 4a. The variation of the width of the gap between two angular positions indicated by the indicia lines 10g, is less than the thickness of the wire of which the clutch spring 9 is coiled. Since the gap between end faces 5c and 6e should be less than the thickness of the wire of the clutch spring 9 in order to prevent entering of a wire loop into the gap, the axial width of the gap can be stepwise increased until the permissible maximum gap is obtained even after considerable wear of the end faces 5c and 6e due to prolonged use of the device.

The rack 13 is part of a paper carriage which is moved in the writing and tabulating direction by a spring, and is manually returned to its initial position in a direction opposite to the tabulating and writing direction.

The free movement of the carriage and rack 13 in the tabulating direction causes rotation of the input means 5 in such a direction that spring 9 is tightened and connects the input and output portions 5a and 6a for rotation, so that the rotating input means 5 rotates the output means 6 together with the brake means 7 and 8, whereby the centrifugal force urges brake means 7 and 8 against the inner cylindrical brake surface 10a' of the end member 10.

During the return movement of the carriage and rack 13 in the opposite direction, the coil spring 9 is spread so that its diameter increases, and input portion 5a is not coupled with output portion 6a so that output means 6 with brake means 7 and 8 do not rotate so that the retracted brake means 7 and 8 do not exert any braking action.

It will be understood that each of the elements described above, or two or more together, may also find a useful application in other types of tabulator brake means differing from the types described above.

While the invention has been illustrated and described as embodied in a one way clutch and brake device for braking the tabulating movement of the paper carriage of a typewriter without braking the return movement of the carriage, it is not intended to be limited to the details shown, since various modifications and structural changes may be made without departing in any way from the spirit of the present invention.

Without further analysis, the foregoing will so fully reveal the gist of the present invention that others can, by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. One way clutch and brake device, comprising brake housing means including first and second end members; one way clutch means including input means and output means mounted for rotation and axial movement in said housing means adjacent said first and second end members, respectively, and having cylindrical input and output portions, respectively, with confronting end faces forming an axial gap, and a coiled clutch spring mounted on said cylindrical input and output portions and having ends secured to the same, respectively; centrifugal brake means mounted on said output means and engaging said brake housing means during rapid rotation of said output means; operating means for rotating said input means so that during rotation in one direction said clutch spring is contracted for connecting said cylindrical input and output portions whereby said output means is rotated and said brake means operated, and so that during rotation in the opposite direction said clutch spring is spread and said output means and brake means are not operated; adjusting means including one end portion engaging one of said end members, an abutment portion abutting the one of said input and output means which is located adjacent the other end member, and a manually operable other end portion projecting out of said other end member whereby by manual adjustment the axial width of said gap is varied; means on said other end member for indicating the position of said manually operable other end portion and thereby the adjusted axial width of said gap; and attaching means for detachably securing said other end member to said abutment portion and to said one end member.

2. One way clutch and brake device as claimed in claim 1 wherein said adjusting means includes a shaft supporting said input and output means for rotation, and having said one end portion threaded and threadedly engaging said one end member, said abutment portion, and said other end portion which projects out of the other end member and is manually operable for threading said threaded end portions into and out of said one end member whereby the axial distance between said abutment portion and said one end member and thereby the axial width of said gap are adjusted.

3. One way clutch and brake device as claimed in claim 2 wherein said manually operable other end portion of said shaft has an end face with a slot adapted to be engaged by a tool; and wherein said means on said other end member inlcude a plurality of indicating means radially outwardly extending from said other end portion for indicating the position of said slot.

4. One way clutch and brake device, comprising brake housing means including first and second end members; one way clutch means including input means and output means mounted for rotation and axial movement in said housing means adjacent said first and second end members, respectively, and having cylindrical input and output portions, respectively, with confronting end faces forming an axial gap, and a coiled clutch spring mounted on said cylindrical input and output portions and having ends secured to the same, respectively; centrifugal brake means mounted on said output means and engaging said brake housing means during rapid rotation of said output means; operating means for rotating said input means so that during rotation in one direction said clutch means spring is contracted for connecting said cylindrical input and output portions whereby said output means is rotated and said brake means operated, and so that during rotation in the opposite direction said clutch spring is spread and said output means and brake means are not operated; adjusting means including a shaft supporting said input and output means for rotation, and having one threaded end portion threadedly engaging said one end member, said shaft having an abutment portion abutting the one of said inlet and outlet means located adjacent the other end member, and a manually operated threaded other end portion projecting out of said other end member being manually operated for threading said threaded end portion into and out of said one member whereby the axial distance between said abutment portion and said one end member and thereby the axial width of said gap are adjusted; means on said other end member indicating the position of said manually operable other end portion and thereby the adjusted axial width of said gap; and attaching means for detachably securing said other end member to said abutment portion and to said one end member, and including a nut on said threaded other end portion for pressing said other end member against said abutment portion of said shaft.

5. One way clutch and brake device as claimed in claim 4 wherein said abutment portion is a flange of said shaft abutting said output means; and wherein said nut presses said other end member against said flange.

6. One way clutch and brake device as claimed in claim 4 wherein said one end member is a fixed plate having a cutout radially spaced from said shaft; and wherein said other end member is dished and has an inner circular surface cooperating with said brake means and a central bore through which said other end portion of said shaft projects outward; and wherein said attaching means include a plurality of abutments secured to said other end member and abutting said fixed plate and including a projection located in said cutout so that said other end member cannot turn relative to said fixed plate.

7. One way clutch and brake device, comprising brake housing means including first and second end members; one way clutch means including input means and output means mounted for rotation and axial movement in said housing means adjacent said first and second end members, respectively, and having cylindrical input and output portions respectively, with confronting end faces forming an axial gap, and output portions and having ends secured to the same, respectively, said output means including a disc radially projecting from said cylindrical output portion, and having pivot means along the periphery thereof; centrifugal brake means including brake weights mounted on said pivot means for movement, and engaging an inner circumferential brake surface of the respective end member of said brake housing; operating means for rotating said input means so that during rotation in one direction said clutch spring is contracted for connecting said cylindrical input and output portions whereby said output means is rotated and said brake means operated, and so that during rotation in the opposite direction said clutch spring is spread and said output means and brake means are not operated; adjusting means including one end portion engaging one of said end members, an abutment portion abutting the one of said inlet and outlet means which is located adjacent the other end member, and a manually operable other end portion projecting out of said other end member which has said inner circumferential brake surface whereby by manual adjustment the axial width of said gap is varied; said clutch spring having one end secured to said disc; means on said other end member for indicting the position of said manually operable other end portion and thereby the adjusted axial width of said gap; and attaching means for detachably securing said other end member to said abutment portion and to said one end member.

8. One way clutch and brake device as claimed in claim 4 wherein said input means includes a rotary gear; wherein said operating means include a rack forming part of a typewriter carriage and being movable with the same in a writing and tabulating direction which is said one direction, and in the opposite return direction, and a pinion mounted on said one end member for rotation and meshing with said rack and said gear so that said input means is rotated during movement of said carriage relative to said one end member.

9. One way clutch and brake device as claimed in claim 1 wherein said adjusting means includes a shaft supporting said input and output means for rotation, and having said one end portion threaded and threadedly engaging said one end member, said abutment portion, and said other end portion which projects out of the other end member and is manually operable for threading said threaded end portion into and out of said one end member whereby the axial distance between said abutment portion and said one end member and thereby the axial width of said gap are adjusted; wherein said other end portion is threaded; wherein said attaching means comprise a nut on said threaded other end portion for pressing said other end member against said abutment portion of said shaft; wherein said manually operable other end portion of said shaft has an end face with a slot adapted to be engaged by a tool; and wherein said means on said other end member include a plurality of indicating means radially outwardly extending from said other end portion for indicating the position of said slot.

10. One way clutch and brake device as claimed in claim 9, wherein said one end member is a fixed plate having a cutout radially spaced from said shaft; wherein said other end member is dished and has an inner circular surface cooperating with said brake means and a central bore through which said other end portion of said shaft projects outward; wherein said attaching means include a plurality of abutments secured to said other end member and abutting said fixed plate and including a projection located in said cutout so that said other end member cannot turn relative to said fixed plate; wherein said input means includes a rotary gear; wherein said operating means include a rack forming part of a typewriter carriage and being movable with the same in a writing and tabulating direction which is said one direction, and in the opposite return direction, and a pinion mounted on said fixed plate for rotation and meshing with said rack and said gear so that said input means is rotated during movement of said carriage relative to said fixed plate.

* * * * *